June 7, 1960 F. KRAHULEC 2,939,715

PHONOGRAPH RECORD PLAYER

Filed March 5, 1957

INVENTOR
FRED KRAHULEC

BY

Mason, Kolehmainen, Rathburn and Wyss.

ATTORNEYS 2,939,715
Patented June 7, 1960

2,939,715

PHONOGRAPH RECORD PLAYER

Fred Krahulec, 7936 Karlov Ave., Skokie, Ill.

Filed Mar. 5, 1957, Ser. No. 644,170

11 Claims. (Cl. 274—15)

The present invention relates to phonograph record players and particularly to message repeaters or replaying devices for use with record players of the type using disk records.

It is an object of the present invention to provide a record replaying device which is simple and durable in construction, which is reliable in use, and which may be manufactured at a relatively low cost.

It is another object of the present invention to provide a new and improved attachment for record players for automatically causing continuous replaying of a record.

It is a further object of the present invention to provide a replaying device which is simple and durable in construction, which may be included in new equipment or easily applied as an attachment to existing machines, and which device does not cause injury to any parts of the machine or to the record disks.

Another object of this invention is to provide a new and improved record player which includes automatic means for returning the tone arm and its playing needle to the beginning portion of a sound groove in a disk record when the tone arm and its playing needle have moved to the latter portion of the sound groove.

Briefly, the above and further objects are realized in accordance with the present invention by providing a replaying or message repeating device which comprises as its primary element a permanent magnet mounted on an auxiliary control arm extending from the tone arm beneath the turntable. The magnet is selectively engageable with the turntable, which is at least partially magnetic, so as to utilize a small fraction of the power supplied to the turntable by the turntable drive motor for lifting the tone arm and associated playing stylus out of the latter part of the groove in a disk record and returning them to the beginning of the groove.

The invention, both as to its organization and operation, together with further objects and advantages thereof, will best be understood by reference to the following detailed description taken in connection with the accompanying drawing, in which.

Figures 1, 2, 3, 4, 5, 6:
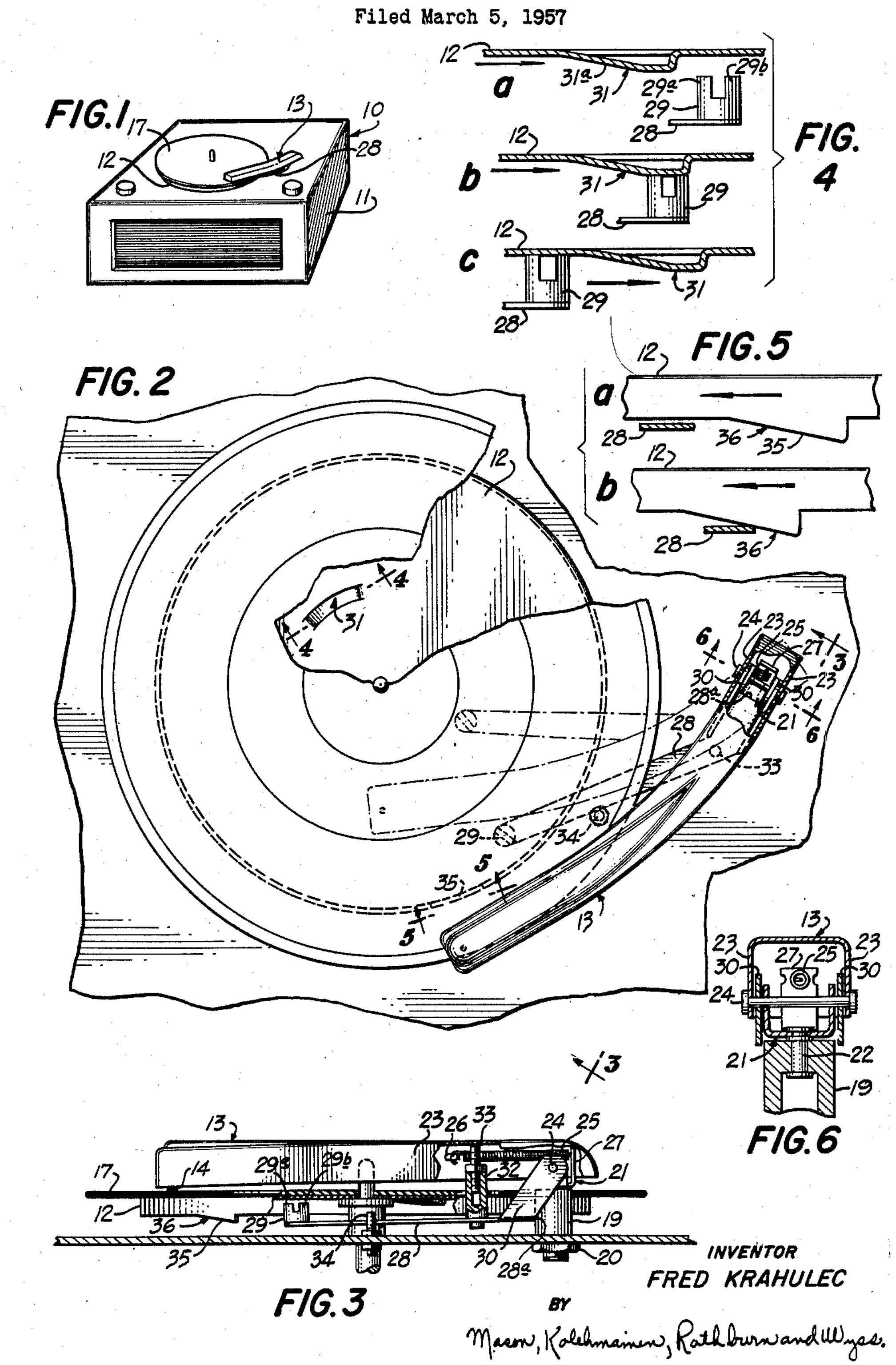
Fig. 1 is a perspective view of a disk record player embodying the present invention.
Fig. 2 is a top plan view, partially broken away, of the turntable and tone arm portion of the device of Fig. 1.
Fig. 3 is a sectional view, with certain portions broken away, of the device of Fig. 2 taken along the line 3—3 thereof.

Figs. 4*a*, 4*b*, and 4*c*, are sectional views taken along the line 4—4 of Fig. 2, with the turntable in different angular positions with respect to the auxiliary control arm;

Figs. 5*a* and 5*b* are sectional views taken along the line 5—5 of Fig. 2 and showing the turntable in different angular positions; and Fig. 6 is a sectional view taken along the line 6—6 of Fig. 2.

Referring now to the drawings, and particularly to Figs. 1–3, the record player 10 which is there shown comprises a suitable housing or cabinet 11 on the top of which is rotatably mounted a turntable 12 for supporting disk records to be played. It will be understood that a motor and associated parts are provided for driving the turntable, but inasmuch as they do not constitute a part of this invention they are not shown in the drawings or described in detail. A tone arm 13 including a playing needle or stylus 14 is mounted for relatively free horizontal and pivotal movement adjacent the periphery of the turntable so that the arm 13 and its associated playing needle 14 may be moved into and out of engagement with a spirally grooved record 17 positioned on the turntable 12, and, moreover, may be swung through an arc so as to be engageable with all portions of the groove. The record player as thus far described is conventional and as the turntable 12 is driven by the turntable motor (not shown) in a clockwise direction as viewed in Fig. 2, the stylus 14, which is disposed within the spiral playing groove of the record 17, causes the tone arm 13 to pivot about its vertical pivotal axis toward the center of the record 17 and the turntable 12.

Present day phonograph records of the disk type comprise a principal sound groove, which is on the outer part of the disk just inside an outer narrow smooth portion, an inner circular or continuous groove on which no sound has been recorded and a second spiral groove which connects the sound groove with the circular inner groove. The pitches of the spirals to which the two spiral portions of the groove respectively conform are substantially different so that once the sound portion of the groove has been traversed, the tone arm 13 moves quite rapidly toward the center of the record into the circular groove. In the device used to illustrate the present invention, the tone arm 13 and associated stylus 14 are disengaged from the record 17 while the inner groove is being traversed. Obviously, however, the replay operation could commence when the stylus 14 is traversing a different part of the record. The arm 13 and stylus 14 are then returned to the periphery of the record 17 and the stylus 14 is subsequently gently lowered into the beginning portion of the sound groove, the entire operation occurring during approximately one-half revolution of the turntable 12. Accordingly, the time lapse between the termination of one play of the record and the commencement of the next play is no more than a few seconds.

The tone arm 13 and associated mounting structure are conventional. A vertical post 19 is fixedly secured by any suitable means such as a nut 20 to the housing 11 at a point displaced from the center of the turntable 12 by a distance greater than the radius of the largest size of records to be used with the record player 10. A U-shaped bracket 21 is pivotally supported on top of the post 19 by means of a pintle 22 journaled in the post 19. The body portion of the arm 13 is substantially hollow and includes depending side flanges 23 which are suitably apertured to receive a horizontal pintle 24 which extends through apertures in the upstanding arms of the bracket 21. A universal connection is thus provided between the tone arm 13 and the housing 11 to enable the required movement of the tone arm 13. The weight of the tone arm 13 is sufficient to maintain the stylus 14 in the sound groove of the record disk 17, and in the illustrated device the effective weight of the tone arm 13 on the record disk 17 is controlled by a helical coil spring 25 which is stretched between one of a plurality of struck-out members 26 on the arm 13 and the upstanding lug 27 on the bracket 21.

The mechanism which returns the tone arm 13 and stylus 14 to the beginning of the sound groove after each playing of the record 17, comprises a permanent magnet 29 mounted near the end of a control arm 28 which is pivotally attached to the yoke bracket 21 by the horizontal pintle 24 and extends beneath the turntable 12. The magnet 29 is substantially cylindrical, but is of the horseshoe type with its oppositely polarized faces 29*a* and 29*b* lying in a common plane. When, therefore, as more fully described hereinafter, the magnet engages the bottom face of the turntable 12, which must be entirely or at least partially formed of a magnetic material, and is slidably moved therealong, a relatively small frictional force opposes such movement.

In order to permit movement of the magnet 29 into full surface engagement with the flat bottom of the turntable 12, the control arm 28 includes a pair of spaced apart upstanding flanges 30 having their apertured end portions interposed between the flanges 23 of the arm 13 and the arms of the yoke bracket 21. The flanges 30 necessarily diverge at an obtuse angle from the body portion of the arm 28 so that in a normal position, as shown in Fig. 3, the magnet 29 is spaced from the turntable 12.

As a record is being played, the control arm 28 which is shorter than and diverges from the tone arm 13, precedes the movement of the tone arm 13 across the turntable toward the center thereof, the tone arm 13 moving across the top of the turntable in the sound groove of the record 17 and the control arm 13 moving across the bottom of the turntable 12 out of engagement therewith. After the stylus 14 has left the end of the intelligence carrying portion of the groove, which end is at a relatively fixed radius for all record disks, and travels a short distance through the transition groove to the circular inner groove, the magnet 29 travels directly beneath a struckdown portion 31 of the turntable. The length of the air gap between the magnet 29 and the turntable 12 is thereby reduced and the coercive force across the air gap pulls the magnet 29 into engagement with the struck-down portion 31. Continued rotation of the turntable 12 causes the magnet 29 to ride up the inclined trailing edge 31*a* of the portion 31 and onto the bottom surface of the turntable 12. This sequence of events is illustrated in Figs. 4*a* through 4*c*. In Fig. 4*a* the portion 31 is approaching the magnet 29 which is moving in a circle by virtue of the fact that the needle 14 is riding in the circular groove in the record 17. In Fig. 4*b* the portion 31 is directly above the magnet 29 and the magnetic flux has pulled the magnet into engagement with the portion 31. In Fig. 4*c* the magnet has slid up the trailing edge 31*a* and is now on the bottom surface of the turntable 12.

An important feature of the invention is that the lowermost part of the depending portion 31 moves in a plane which is above the top of the magnet. Therefore, if a record which does not have an inner circular groove, or one having a somewhat off-size inner circular groove is used, the magnet 29 never moves into the side of the portion 31, which, of course, might jam the operation of the replay mechanism or at least impair the smoothness of its operation.

The upward movement of the magnet 29 along the edge 31*a* of the portion 31 is followed by the tone arm 13 because of a vertically adjustable lifting pin assembly 32 which is fixed, in any suitable manner to the arm 28 directly beneath the central longitudinal axis of the tone arm 13. The threaded upper portion 33 of the pin assembly 32 engages the arm 13 and as the magnet 29 rides along the portion 31*a* onto the bottom surface of the turntable 12, the stylus 14 is lifted out of the groove in the record 17.

As soon as the magnet 29 reaches the bottom surface of the turntable 12, it is forced outwardly by the tangential force exerted thereon by the rotation of the turntable 12, and in a fraction of a revolution of the turntable 12 moves the stylus 14 to a position directly above the outer or beginning portion of the sound groove in the record 17. Further outward movement of the tone arm 13 is prevented by means of a stop pin 34 which extends up from the top of the housing 11 beneath the turntable 12. The spacing of the pin 34 from the center of the turntable 12 may be adjustable so as to facilitate the adaption of the replay device for different sizes of records.

Further rotation of the turntable 12 results in an inclined leading edge 35 of a depending cam 36 on the rim of the turntable 12 to engage the control arm 28 (Fig. 5*a*) and while following the leading edge 35 (Fig. 5*b*), to gently lower the stylus 14 into the sound groove in the record disk 17. The slope of the cam 36 determines the gentleness with which the stylus 14 is placed in the sound groove. Simultaneously, the magnet 29 is moved out of engagement with the turntable 12 and when the air gap becomes sufficiently long, which is the case when the trailing end portion of the cam 36 is reached, the control arm drops to its lowest or normal position as shown in Fig. 3. The magnet 29 and control arm 28 then remain in their lowermost or normal position until the record 17 has been played and the depending portion 31 once more moves into proximity with the magnet 29. With the arm 28 in this normal or transcribing position, the top of the pin assembly 33 should be slightly spaced from the tone arm 13 so as not to interfere with the tracking of the sound groove on the disk 17. Since the magnet 29 and the control arm 28 are very light, the force required to pivot them during the playing of a record is so small as to be negligible even with the most delicate of recording equipment.

An important feature of this device not heretofore stressed is that no sidewise force is exerted on the playing stylus 14 or on the sides of the grooves in the record disk 17 during automatic removal and insertion of the stylus 14 in the groove. While the stylus 14 is being lowered into the sound groove, the stop pin 34 maintains it at a fixed distance from the center of the turntable and since the sound groove is essentially circular throughout the arcuate length of the cam 36, any force exerted between the stylus 14 and the sides of the sound groove is appreciably less than that which is effected during manual use of the record player. While the stylus 14 is being lifted out of the inner groove of the record disk 17, the needle 14 is maintained at a fixed distance from the center of the turntable and thus in the circular inner groove because the outwardly directed centrifugal force developed by the rotation of the magnet 29 after it engages the depressed portion 31 is counteracted by the inwardly directed force exerted on the magnet 29 as the magnet rides up the inclined trailing edge 31*a*. Accordingly, the sidewise force exerted on the stylus 14 during removal thereof from the inner groove is negligible.

In describing the invention, the entire turntable has been described as being formed of a magnetic material. However, in order to use the replay device of the present invention with a nonmagnetic turntable, a depending magnetic member and associated magnetic track, which would constitute part of a spiral, may be affixed to the bottom of the nonmagnetic turntable for lifting the tone arm in the above described manner and attracting the magnet 29 so as to return the stylus to the beginning of the sound groove.

While the invention has been described by means of a particular embodiment thereof, it will be understood that those skilled in the art may make many changes and modifications without departing from the true spirit and scope of the invention, and accordingly, all such changes and modifications which fall within the true spirit and scope of this invention are intended to be covered in the appended claims.

What is claimed as new and desired to be secured by Letters Patent of the United States is:

1. In a record player having a tone arm, a reproducer and a motor driven turntable, automatic replay apparatus comprising an auxiliary control arm attached to the tone arm so as to be movable therewith below said turntable, a magnet supported on said control arm beneath said turntable, said turntable at least on the underside thereof exhibiting ferromagnetic characteristics, said magnet being spaced from the underside of said turntable when said tone arm engages the sound groove of a record disposed on said turntable, to provide an air gap between said magnet and the underside of said turntable, and means movable with said turntable for reducing the reluctance of said air gap when said control arm has moved to within a predetermined distance from the center of said turntable, whereby said magnet is magnetically attracted into engagement with said turntable and lifts said tone arm out of engagement with a record supported on said turntable.

2. In a record player having a tone arm, and a motor driven turntable for supporting a record thereon, said turntable being formed of a magnetic material, automatic replay apparatus comprising an auxiliary control arm attached to said tone arm for corresponding movement therewith beneath said turntable, said control arm having a permanent magnet mounted near the end thereof beneath said turntable, stop means associated with said control arm for limiting the downward movement of said magnet thereby to control the length of the maximum air gap between said magnet and the bottom surface of said turntable, said maximum air gap having such a length as to place the turntable outside the coercive range of said magnet, and magnetic means depending from said turntable into the coercive range of said magnet when said tone arm has moved a predetermined distance toward the center of said turntable for causing said magnet to be attracted against the bottom surface of said turntable thereby to lift said tone arm from engagement with the record disposed on said turntable.

3. Automatic replay apparatus as set forth in claim 2, wherein said control arm and said tone arm are connected for corresponding movement in a vertical direction by means of a lost motion connection, whereby the weight of said control arm is not supported by said disk record during the playing thereof.

4. In a record player having a tone arm and a motor driven turntable, said turntable at least on the underside thereof exhibiting ferromagnetic characteristics, message repeater apparatus comprising an auxiliary control arm attached to the tone arm so as to be movable below said turntable in substantial conformity with the movement of said tone arm above said turntable, a permanent magnet supported on said control arm beneath said turntable, said underside of said turntable being outside the coercive range of said magnet when said tone arm is effective to play a record disposd on said turntable, a depending member on said turntable, said depending member being magnetic and so positioned with respect to the center of said turntable as to operatively engage said magnet after said tone arm has completely traversed the sound groove of a record supported on said turntable, said depending member having an inclined trailing edge terminating at the lower surface of said turntable thereby to lift said control arm and consequently said tone arm as the magnet engages the underside of said turntable, the continued rotation of said turntable with the magnet engaging the underside thereof causing movement of said control arm in an outward direction, stop means for limiting the outward movement of said control arm with respect to the center of said turntable, and a depending cam member on said turntable having an inclined leading edge, said depending cam member being disposed on said turntable so as to engage said control arm and depress said magnet out of engagement with the underside of said turntable and thereby lower said tone arm into engagement with the initial groove of said record.

5. Automatic message repeater apparatus as set forth in claim 4, wherein said depending cam portion is on a depending rim of said turntable.

6. The message repeater apparatus as set forth in claim 4, wherein the trailing edge of said depending member is tapered so that the effect of the tangential force on said control arm to move said tone arm outwardly with respect to the center of said record is counteracted by the resultant force exerted on said magnet and thus said tone arm as said tone arm rides up said trailing edge of said depending member.

7. In a record player having a motor driven turntable and a tone arm mounted for horizontal and vertical pivotal movement about a post positioned adjacent the periphery of said turntable, automatic replay apparatus comprising an auxiliary control arm attached to said tone arm for corresponding movement therewith below said turntable, said control arm having upstanding inclined flanges for pivotal attachment to a horizontal pintle on which said tone arm is mounted, a permanent magnet mounted on said control arm beneath said turntable, said control arm being so positioned when said tone arm is effective to play a record disposed on said turntable that the air gap between the said magnet and the bottom of said turntable is sufficiently great that the coercive force exerted between said turntable and said magnet by the magnetic flux therebetween is insufficient to move said magnet and attached parts into engagement with the underside of said turntable, and means on said turntable for causing said magnet to be attracted to the underside of said turntable to lift said tone arm away from said turntable.

8. In a record player of the type including a turntable for rotating a record to be played, a vertically and horizontally pivoted tone arm and a playing stylus for operatively engaging the sound groove of said record, the combination of a surface on the underside of said turntable having the characteristics of ferromagnetic material, an arm attached to said tone arm for movement therewith beneath said turntable, a magnet mounted on said arm and attracted to said surface when said surface is within the coercive range of said magnet, and stop means on said arm for supporting said arm and said magnet at a predetermined distance from said turntable.

9. In a disk type record player of the type comprising a record receiving turntable and a tone arm connected by means of a universal joint assembly to a fixed location adjacent said turntable, the combination of a control arm, means for supporting said control arm for pivotal movement in both horizontal and vertical directions, means directly connecting said control arm and said tone arm for simultaneous horizontal movement, a lost motion connection for connecting said arms for relative vertical movement, and a permanent magnet mounted on said control arm and magnetically attracted directly to the underside of said turntable when the underside of said turntable is within the coercive range of said magnet.

10. A record player comprising a rotatable record supporting turntable, a tone arm supported for vertical and horizontal movement relative to a record disposed on said turntable, a control arm movable generally with said tone arm but disposed below said turntable, a permanent magnet mounted on said control arm, the underside of said turntable including means causing an attractive force between it and said magnet when the underside of said turntable is within the coercive range of said magnet, means on the underside of said turntable effective when said tone arm has completed traversing the sound groove in a record disposed on said turntable for effectively reducing the reluctance of the gap between said record and said magnet whereby said magnet raises said control and tone arms as it moves into engagement with the underside of said turntable, the tangential force of continued rotation of said turntable moving said control arm and hence said tone arm from the center toward the outside of said record while said magnet is in engagement with the underside of said turntable, stop means for limiting the outward movement of said tone arm, and means effective when said stop means are effective to move said magnet away from said turntable whereby said tone arm is lowered into engagement with the sound groove of said record.

11. In a record transducing apparatus, a movably mounted mechanism for supporting and moving a record, said mechanism including a mass of magnetic material movable with said mechanism, record transducing means movable relative to a record supported by said mechanism, permanent magnetic means connected to said transducing means, and means for selectively coupling said permanent magnet to said mass of magnetic material so that said transducing means moves with said mechanism.

References Cited in the file of this patent

UNITED STATES PATENTS

| | | |
|---|---|---|
| 1,405,751 | Bullock | Feb. 7, 1922 |
| 2,031,074 | Scheibell | Feb. 18, 1936 |
| 2,561,466 | Gahagan | July 24, 1951 |